United States Patent [19]

Gould

[11] Patent Number: 4,484,732
[45] Date of Patent: Nov. 27, 1984

[54] CONSTANT AND VARIABLE FORCE TENSIONING DEVICES UTILIZING ATMOSPHERIC PRESSURE

[76] Inventor: Larry D. Gould, South Rd., Canaan, N.H. 03741

[21] Appl. No.: 383,419

[22] Filed: Jun. 1, 1982

[51] Int. Cl.³ .............................................. B60G 11/26
[52] U.S. Cl. .............................. 267/64.14; 74/501.5 R
[58] Field of Search .................. 74/583, 589, 501.5 R; 188/269–270, 322.17, 322.11, 322.22, 301; 267/69, 64.14; 92/162 R

[56] References Cited

U.S. PATENT DOCUMENTS

| | | | |
|---|---|---|---|
| 1,918,699 | 9/1929 | Gruss | 188/317 |
| 2,395,261 | 2/1946 | Findley | 74/501.5 R |
| 2,515,274 | 7/1950 | Stevenson | 74/501.5 R |
| 2,721,074 | 10/1955 | DeCarbon | 188/269 |
| 3,037,765 | 6/1962 | Francis | 267/64.14 |
| 3,127,788 | 4/1964 | Martens | 74/586 |
| 3,141,352 | 7/1964 | Richter | 74/501.5 R |
| 3,363,893 | 1/1968 | Goddard | 267/64.14 |
| 3,372,776 | 3/1968 | Auner et al. | 188/322.17 |
| 3,516,520 | 6/1970 | Agren et al. | 188/282 |
| 3,853,038 | 12/1974 | Roland | 92/162 |
| 4,274,300 | 6/1981 | Golobay | 74/501.5 R |

FOREIGN PATENT DOCUMENTS 0820818  9/1959  United Kingdom ............. 267/64.14

Primary Examiner—Duane A. Reger
Assistant Examiner—Alvin Oberley
Attorney, Agent, or Firm—Darrell E. Hollis

[57] ABSTRACT

Improved constant and variable force tensioning devices are made possible by utilizing atmospheric pressure to provide the restoring force. In one embodiment, a sealed and substantially evacuated canister is provided with a rigid actuating rod which can be partially withdrawn through an opening in one end of the canister against the constant restoring force exerted by atmospheric pressure. In another embodiment, the rigid actuator rod is replaced by a long flexible rod or cable which is capable of collapsing or folding upon itself within the canister, thereby providing the constant force device with a longer stroke. In a further embodiment, the actuator rod terminates in a rolling diaphragm seal which seals off only a portion of the canister interior, eliminating the need for a sliding vacuum seal at the point where the actuator rod protrudes from the canister. In a still further embodiment, the canister is at least partially filled with a low vapor pressure liquid which cavitates when the actuator rod is withdrawn. In this embodiment, the difference between ambient atmospheric pressure and the liquid vapor pressure provides either a constant or variable restoring force, depending upon the amount of liquid in the canister and whether any trapped air is present.

12 Claims, 10 Drawing Figures

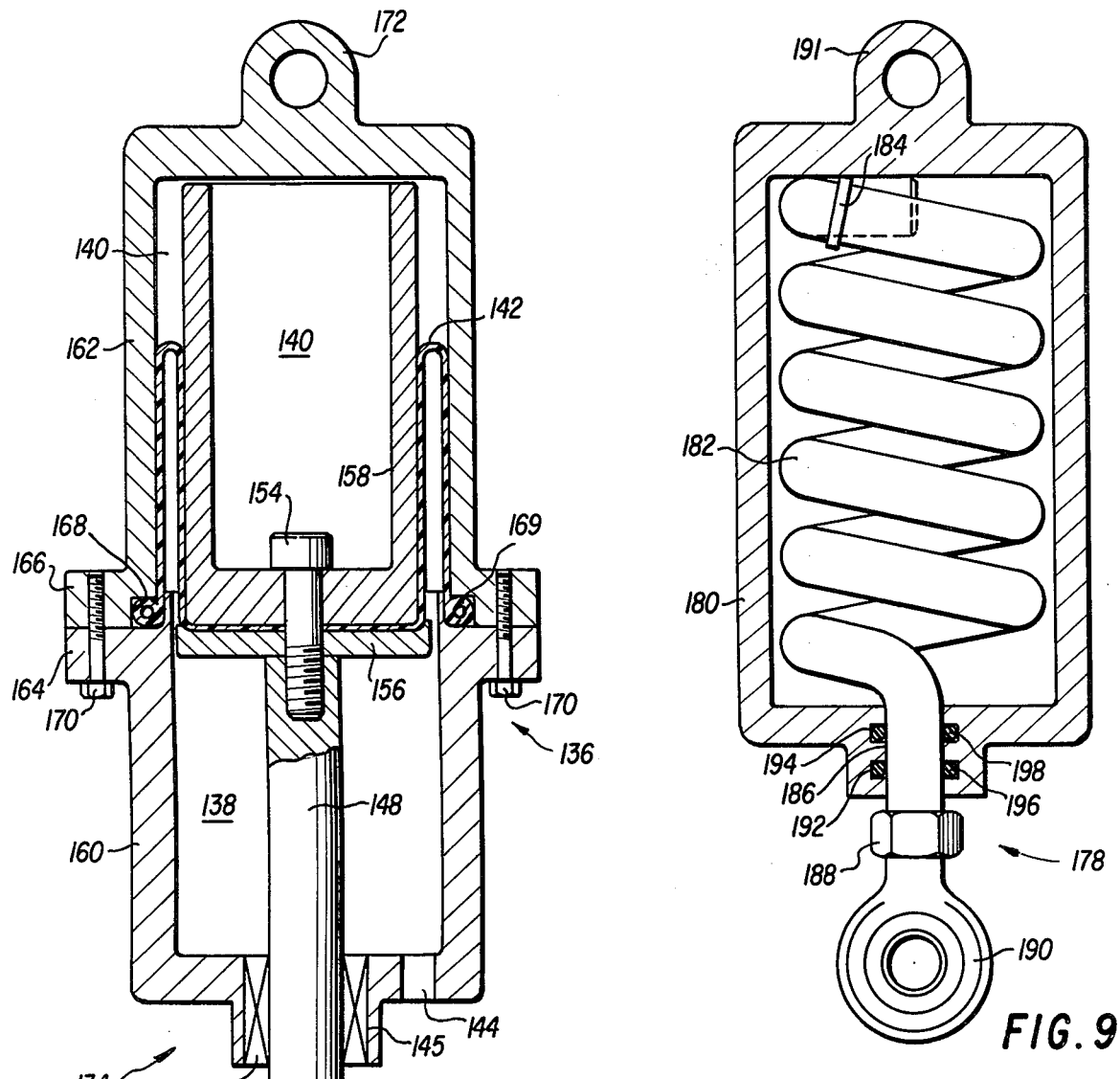
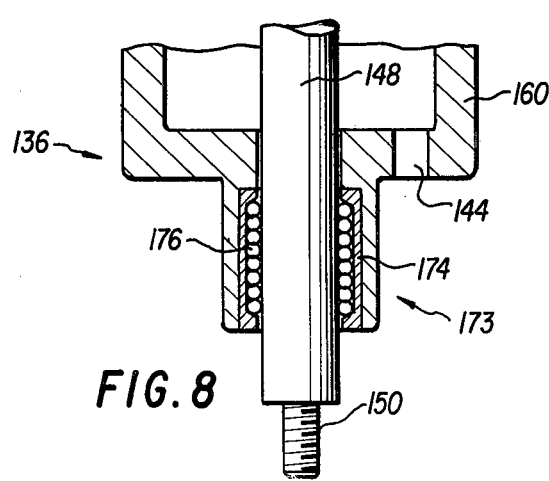

CONSTANT AND VARIABLE FORCE TENSIONING DEVICES UTILIZING ATMOSPHERIC PRESSURE

STATEMENT OF GOVERNMENT INTEREST

The invention described and claimed herein may be manufactured and used by or for the Government of the United States of America for governmental purposes without the payment of royalties thereon or therefor.

BACKGROUND OF THE INVENTION

1. Field of the Invention

The present invention relates to tensioning devices for exerting constant and variable tensional forces, as for example between two relatively movable parts of a machine, and to mechanical systems including such tensioning devices.

2. Description of the Prior Art

There are many types of mechanical systems in which a constant tensional force must be maintained between two relatively movable members, as for example between stationary and movable parts of a machine or other mechanical system. Examples of mechanical systems in which this requirement exists range from precision measuring and testing instruments to agricultural machinery. Components of such instruments and machines often must be preloaded with a constant force device. This preloading force may have to be very nearly constant over a considerable uniaxial displacement distance. A particularly important need for constant force tensioning devices occurs in the aerospace industry, in which it is frequently necessary to maintain a constant level of tension in the control linkages or cables of an aircraft despite the effects of stretching, temperature-induced expansion and contraction, and material wear.

Conventional mechanical spring devices, such as coil springs and leaf springs, are generally characterized by a linear increase or decrease in the spring force as the spring displacement or deflection is varied. This relationship is usually expressed by the well-known equation $F=Kx$, where F is the restoring force exerted by the spring, x is the displacement distance, and K is the so-called "spring constant". It is apparent from this equation that conventional types of springs must be limited to small displacements, or deflections, if the restoring force is to remain reasonably constant. Consequently, conventional types of springs are poorly suited to systems in which constant tension requirements are imposed. See, for example, U.S. Pat. No. 3,141,352, which discloses tension maintaining devices containing doil springs, but points out that these devices will not provide a substantially constant tensional force unless the displacement distances are small and the springs are selected with care.

Special flat coil type springs, similar to clock springs, have been developed to satisfy a constant force requirement. Unfortunately, springs of this type are subject to extremely high local stresses when they are in use, leading to premature and catastrophic failure. In applications requiring rapid actuation or high cycle life, therefore, this type of spring is generally unsatisfactory. The possibility of early and catastrophic failure is particularly unsatisfactory in applications which require high reliability, such as in the aerospace industry.

A variety of other types of devices have been proposed to satisfy constant tension requirements. In U.S. Pat. No. 4,274,300, for example, a device consisting of a reciprocable arrangement of rotary cam surfaces and a fixed follower pin is provided for automatically taking up slack in a cable system. However, the device is adjustable only in increments, rather than continuously, and it requires a positive actuating movement of the cable system before the desired self-adjustment will occur. Another example of a tension-maintaining device for cable systems may be found in U.S. Pat. No. 2,515,274, which proposes a fluid-filled hydraulic unit including a spring-controlled piston and valve member and an expansible and contractable volumetric chamber vented to the atmosphere. When a sudden load is applied to the cable to which the device is attached, the piston valve closes and the device becomes a solid hydraulic unit by virtue of the incompressible fluid (e.g., oil) therein. Under no-load conditions, the piston valve is open and the spring operates to maintain cable tension by moving the piston in one direction or the other. The use of an ordinary coil spring as the primary tension-maintaining element, however, means that the restoring force will vary somewhat as the piston moves, rather than remaining substantially constant. The expansible volumetric chamber compensates for the displacement of the fluid medium within the unit (e.g., due to withdrawal of the piston rod or changes in temperature and barometric pressure), but does not compensate for the variable force characteristic of the coil spring. A further example of a tension-maintaining device for cable systems may be found in U.S. Pat. No. 2,395,261, in which the proposed device consists of a cylindrical tube or casing made of a metal having a high coefficient of thermal expansion (such as aluminum) surrounding a longitudinal rod made of a metal having a low coefficient of thermal expansion (such as Invar). The tube and rod are connected by an arrangement of levers which produce a mechanical advantage that is effective to maintain constant tension in a cable attached to the device. The disadvantage of this device is that it is responsive only to temperature changes and does not compensate for other factors affecting the cable tension, such as gradual stretching of the cable over time.

SUMMARY OF THE INVENTION

In accordance with the present invention, the foregoing limitations and disadvantages of the prior art are substantialy avoided by utilizing ambient atmospheric pressure to provide the restoring force in a tensioning device. Although the invention is of particular utility in applications where the tensional force must be maintained substantialy constant regardless of the device displacement or travel distance, the principles of the present invention can also be used to provide tensioning devices in which the restoring force varies according to the amount of displacement or travel distance.

In its broadest aspect, a tensioning device constructed in accordance with the present invention comprises a container having an interior volume defined by a relatively fixed container portion having interior walls and a relatively movable container portion which is slidably received within the relatively fixed portion, with the relatively movable portion of the container being exposed to and acted upon by ambient atmospheric pressure, together with sealing means disposed be ween the relatively fixed and movable portions of the container for sealing off the interior volume of the container from ambient atmospheric pressure. The relatively movable portion of the container is preferably maintained in a spaced-apart, non-contacting relationship with the interior walls of the relatively fixed container portion. The interior volume of the container may be substantially evacuated of air, preferably to a pressure of about 0.001 torr or less, in which case ambient atmospheric pressure will exert a substantially constant restoring force on the movable part of the container regardless of the relative displacement between the fixed and movable portions of the container. Alternatively, the interior of the container may be at least partially filled with a vaporizable liquid, preferably a liquid having a low vapor pressure such as silicone oil, ethylene gylcol or mercury. In this case, forcible movement of the relatively movable portion of the container away from the relatively fixed portion thereof will cause the liquid to cavitate, giving rise to a restoring force which is dependent upon the difference between the liquid vapor pressure and the local barometric pressure. In embodiments wherein the canister is substantially entirely filled with the liquid, the restoring force will remain substantially constant throughout the range of movement of the actuating member. For partially liquid-filled canisters, the restoring force exerted on the movable actuating member is initially variable as the actuating member is withdrawn, rising from zero to an equilibrium value as the pressure of the air trapped in the canister drops to the point at which the liquid begins to cavitate. Further withdrawal of the actuating member will then simply cause more of the liquid to vaporize, with no change in the restoring force. Constant-force operation can be obtained in this embodiment by preloading the device in one of a number of different ways.

Several different specific embodiments of the invention are possible, utilizing either evacuated or liquid-filled containers. In one embodiment, the tensioning device comprises a substantially evacuated canister having an opening therein for accommodating a movable actuating member, the latter projecting into the canister and having one end protruding from the opening in the canister. The movable actuating member, which is preferably provided in the form of a rigid elongated rod, has a sliding relationship with the opening in the canister to allow the actuating member to be partially withdrawn from the canister through the opening in response to a force applied between the actuating member and the canister. A sealing means is provided for creating a sliding vacuum seal between the movable actuator and the canister opening, thereby maintaining the substantially evacuated condition of the canister. The portion of the actuating member which projects into the canister is preferably maintained in a spaced-apart, non-contacting relationship with the interior walls of the canister. Retaining means may be provided to prevent the movable actuating member from sliding completely into or out of the canister. Attachment means are preferably provided on the canister and on the protruding end of the actuating member to allow the device to be attached to two relatively movable parts of a machine or other mechanical system for exerting constant tension therebetween. The canister interior may be partially filled with a lubricant for lubricating the sliding vacuum seal, which may comprise one or more resilient O-rings or a flexible double-lip seal disposed within the canister opening. Alternatively, the sliding vacuum seal may be of the ferrofluidic type. It should be noted that, due to the extremely low pressure within the canister (preferably about 0.001 torr or less) relative to the ambient atmospheric pressure (normally about 760 torr), the change in the effective interior volume caused by the partial withdrawal of the movable actuating member from the canister causes only a very slight variation in the pressure differential acting on the movable actuating member. Therefore, the restoring force provided by the tensioning device of this embodiment may be considered to be substantially constant regardless of the extent of withdrawal of the movable actuating member.

In another embodiment of the invention, also providing a substantially constant restoring force, the movable actuating member comprises an elongated rod made of a flexible material which is capable of collapsing or folding upon itself within the canister, with the total outstretched length of the flexible rod preferably being greater than the greatest interior dimension of the canister. This provides the constant force device with a longer stroke than would be possible with a rigid actuating rod. Exemplary materials for the flexible rod include synthetic plastic materials, such as polyurethane, or a composite cable structure such as an inner core of braided metal strands with a smooth outer covering of synthetic plastic material.

In a further constant-force embodiment of the invention, the tensioning device comprises a canister having an interior volume with a rolling diaphragm seal disposed therein for dividing the interior volume of the canister into first and second portions. The first portion of the interior volume of the canister is substantially evacuated of air, preferably to a pressure of about 0.001 torr or less as in previous embodiments, but the second portion is maintained substantially at atmospheric pressure. The canister is provided with an opening, communicating with the second portion of its interior volume, for accommodating a movable actuating member such as a rigid elongated rod. The movable actuating member projects into the canister, with one end of the movable actuating member protruding from the canister opening and the other end affixed to the rolling diaphragm seal with the canister interior. The actuating member is movable through the canister opening to cause rolling and unrolling of the diaphragm seal in response to a force exerted between the actuating member and the canister. An enlarged piston member may be affixed to the movable actuating member at the end thereof which is attached to the rolling diaphragm seal, such that the piston member is contained within the first of the two portions of the interior volume of the canister defined by the rolling diaphragm seal. The piston member serves to support the evacuated side of the rolling diaphragm seal during movement of the movable actuating member. A guide bearing may be provided at the canister opening for guiding the motion of the actuating member relative to the canister. As in the previous embodiments, attachment means may be provided on the canister and on the protruding end of the actuating member to facilitate attachment of the device between two relatively movable parts of a machine or other mechanical system. An important advantage of this embodiment is that, by virtue of the rolling diaphragm seal, the need for a sliding vacuum seal at the point where the actuating member protrudes from the canister is eliminated.

In yet another embodiment of the invention, providing either a variable or constant restoring force, the device comprises a canister which is at least partially filled with a vaporizable liquid. The canister has an opening therein for accommodating a movable actuating member, the latter having one end protruding from the canister opening. The movable actuating member has a sliding relationship with the canister opening to allow the actuating member to be partially withdrawn from the canister through the canister opening in response to a force applied between the movable actuating member and the canister. A sealing means is provided for creating a sliding seal between the movable actuating member and the canister opening, which serves to confine the liquid within the canister. Unlike conventional fluid shock absorbers, the portion of the movable actuating member which protrudes into the canister has a spaced-apart, non-contacting relationship with the interior walls of the canister. The liquid is preferably characterized by a low vapor pressure, and may for example be selected from the group consisting of silicone oil, ethylene glycol and mercury. Forcible partial withdrawal of the movable actuating member from the canister causes cavitation of the liquid therein. The difference between ambient atmospheric pressure and the liquid vapor pressure provides the desired restoring force in this embodiment. If the canister is substantially entirely filled with the liquid, the restoring force will remain substantially constant throughout the range of movement of the actuating member. If the canister is only partially filled with the liquid, and the balance of the canister volume is filled with air, the restoring force will initially depend upon how far the actuating member has been withdrawn, rising from zero to a constant value as the pressure of the air drops to the point where the liquid begins to cavitate. Further withdrawal of the actuating member will then simply cause more of the liquid to vaporize, with no change in the pressure differential acting on the actuating member and hence no change in the restoring force. The partially liquid-filled device may be converted to a constant force device, for example by preloading the movable actuating member to the degree necessary to maintain the liquid at its cavitation point.

The present invention comprehends not only tensioning devices per se, but also machines and mechanical systems including such devices as component parts thereof. A machine or mechanical system in accordance with the present invention may comprise a first mechanical part, a second mechanical part which is movable relative to the first mechanical part, and a tensioning device of any of the types described above for exerting a tensional force between the first and second mechanical parts. Such machines or mechanical systems may constitute subsystems of larger machines or mechanical systems such as aerospace vehicle control systems, agricultural machinery, precision measuring and testing instruments, and other types of mechanical apparatus.

BRIEF DESCRIPTION OF THE DRAWINGS

The various objects, advantages and novel features of the invention will be more readily apprehended from the following detailed description when read in conjunction with the appended drawings, in which:

FIG. 7 is a cross-sectional view of a seventh type of tensioning device in accordance with the present invention, utilizing a rolling diaphragm seal to eliminate the need for a sliding vacuum seal at the point where the actuator rod protrudes from the canister, and providing a substantially constant restoring force;

FIG. 8 is a partial cross-sectional view of an eighth type of tensioning device constructed in accordance with the present invention, in which the solid guide bearing of FIG. 7 has been replaced with a ball-type bushing to enhance the sliding movement of the actuator rod relative to the canister opening;

FIG. 9 is a cross-sectional view of a ninth type of tensioning device in accordance with the present invention, also providing a substantially constant restoring force, in which the rigid actuator rod has been replaced by a long flexible rod or cable which is capable of collapsing or folding upon itself within the canister, in order to provide the device with a longer operating stroke.

Throughout the drawings, like reference numerals will be understood to refer to like parts.

DETAILED DESCRIPTION OF THE PREFERRED EMBODIMENTS

Figure 1:
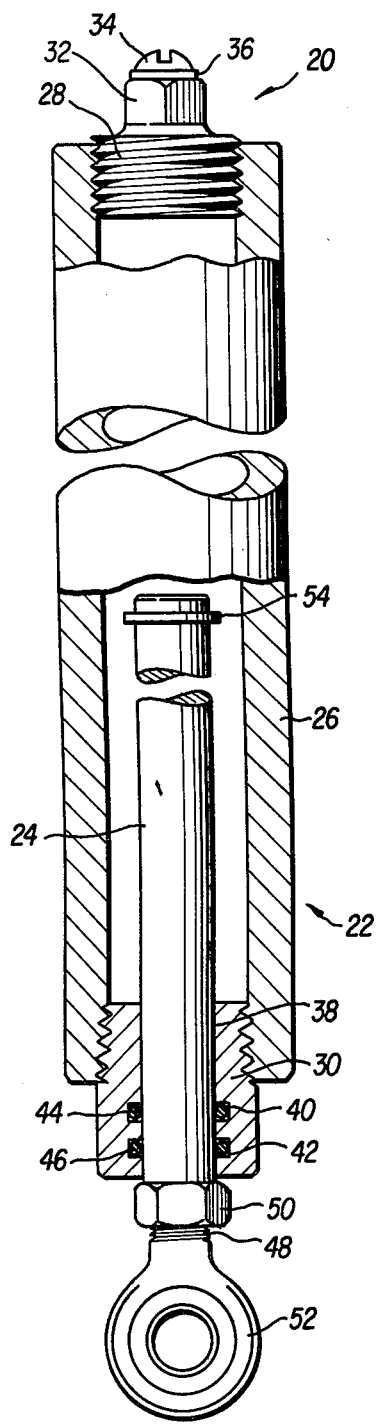
FIG. 1 is a cross-sectional view of a first type of constant-force tensioning device constructed in accordance with the present invention, utilizing a pair of resilient O-rings to provide a sliding vacuum seal at the point where the actuator rod protrudes from the canister.

A tensioning device 20 constructed in accordance with the principles of the present invention is illustrated in cross-section in FIG. 1. The tensioning device 20 comprises, in general, a canister 22 which has been substantially evacuated of air and a rigid, elongated actuator rod 24 which slidably projects into the canister 22 through a restricted opening 38. The canister 22 includes a cylindrical barrel portion 26 which is threaded internally at its upper and lower ends to receive a threaded end cap 28 and a threaded rod cap 30, respectively. The end cap 28 and rod cap 30 serve as top and bottom closures for the barrel 26, providing a sealed canister 22 which can be evacuated to a suitably low pressure, preferably on the order of 0.001 torr or less.

The end cap 28 includes a reduced upper portion that is provided with a number of opposed wrench flats 32 to facilitate installation of the end cap 28 onto the upper end of the barrel 26. Similar wrench flats (not shown) may be provided on the rod cap 30 for this purpose. The end cap 28 is penetrated by a threaded bore (not shown) which extends along the central axis of the end cap and communicates with the interior of the canister 22. The purpose of this bore is to allow initial evacuation of the canister 22 and restoration of the vacuum within the canister after extended periods of use. In other embodiments of the device, the bore can also allow for the introduction of lubricants and other liquids, as will be described hereinafter. The bore is normally closed off by a screw 34 and sealing gasket 36, or some other suitable type of fitting, to seal off the interior of the canister 22 from the ambient atmospheric pressure.

The rod cap 30, which forms the bottom closure for the canister 22, is provided with a cylindrical bore or opening 38 extending along its central axis for slidably receiving the rigid cylindrical actuator rod 24. A pair of circular grooves or recesses 40, 42 are formed on the interior surface of the bore 38 for receiving a pair of conventional resilient O-rings 44, 46. The O-rings 44, 46 bear against the surface of the actuator rod 24 while allowing the rod 24 to slide through the bore 38, thereby creating a sliding vacuum seal between the rod 24 and the bore 38 which serves to maintain the evacuated condition of the canister 22.

As shown in FIG. 1, the actuator rod 24 projects upwardly into the canister 22 and has its lower end protruding from the bore 38. The lower end 48 of the actuator rod is internally threaded to receive an externally threaded rod end bearing 52, the latter serving to attach the actuator rod to one of two relatively movable parts of a machine or mechanical system between which a tensional force is to be maintained. Suitable attachment means (not shown) will also normally be provided for connecting the canister 22 to a second part of a machine or mechanical system. Such attachment means may comprise a clamp which engages the outer surface of the barrel 26, an eyelet (similar to the eyelet 56 in FIG. 2) attached to the barrel 26 or end cap 28, or any other suitable type of attachment device. A hex nut 50, having dimensions too large to pass through the bore 38, is provided on the threaded portion of the rod end bearing 52 to serve as a stop or retainer for preventing the actuator rod from sliding completely into the canister 22. At its upper end, the actuator rod 24 is provided with a peripheral slot or groove (not shown) for receiving a snap ring 54. The snap ring 54, also having dimensions too large to pass through the bore 38, serves as a stop or retainer for preventing the actuator rod 24 from sliding completely out of the canister 22 during operation of the tensioning device 20.

Normally, the barrel 26 and actuator rod 24 will have lengths substantially greater than the lengths shown in FIG. 1, but for clarity the intermediate portions of these elements have been omitted from the drawing. In practice, the length of the actuator rod 24 will be such that when the hex nut 50 is in abutting contact with the rod cap 30, as shown in FIG. 1, the upper end of the actuator rod 24 will be very close to, but will not touch, the lower face of the end cap 28. This provides the tensioning device 20 with the longest possible operating stroke. It should also be pointed out that the tensioning device 20 is operable in any orientation, and need not be maintained in the vertical position shown in FIG. 1.

The manner in which the tensioning device 20 operates will now be described with continued reference to FIG. 1. At the outset, with the screw 34 removed, the interior of the canister 22 is substantially evacuated of air. As noted earlier, it is preferable that the canister 22 be evacuated to a pressure of about 0.001 torr or less, although it should be understood that any pressure that is substantially less than ambient atmospheric pressure will render the device operable to some extent. Due to the pressure differential existing between the interior and exterior of the canister 22, the actuator rod 24 will tend to be drawn into the canister with a force governed by the cross-sectional area of the actuator rod, the air pressure within the canister, and the local barometric pressure external to the canister. If the canister is evacuated to a low enough pressure, preferably on the order of 0.001 torr or less, this factor can be ignored and the pressure differential acting on the actuator rod will be dictated, to a very good approximation, by the local barometric pressure (normally about 760 torr). The force acting on the actuator rod will therefore be very nearly equal to the product of the local barometric pressure and the cross-sectional area of the actuator rod. In practice, the force exerted on the actuator rod will deviate somewhat from the theoretical value due to the static and dynamic coefficients of friction attributable to the O-ring seals, but these effects are not large and can be further minimized by coating the actuator rod and/or the O-rings with a thin layer of lubricant, such as silicone grease. If the canister 22 and the protruding end of the actuator rod 24 are now connected between two relatively movable parts of a machine or other mechanical system, a substantially constant tensional force will be maintained therebetween regardless of how far the actuator rod 24 is withdrawn from the canister 22.

Although it may at first seem doubtful that the restoring force on the actuator rod 24 will remain substantially constant during its withdrawal from the canister 22, a rather extreme example will serve to demonstrate that this is indeed the case. Let it first be assumed that the interior of the canister 22 is evacuated to the preferred pressure of about 0.001 (i.e., $10^{-3}$) torr with the actuator rod 24 in its fully retracted position as illustrated in FIG. 1. Let it then be assumed that the actuator rod 24 is withdrawn to its maximum extent, and that this causes the pressure within the canister interior to be reduced by a factor of one million, to $10^{-9}$ torr. In reality, of course, the reduction in pressure will be very much less dramatic, since the actuator rod 24 will not normally occupy a very large part of the interior volume of the canister 22. When compared to the magnitude of the atmospheric pressure acting on the opposite end of the actuator rod (as noted earlier, about 760 torr), the fractional change in pressure within the canister from $10^{-3}$ torr to $10^{-9}$ torr is negligible. In fact, this fractional change in pressure amounts to only about $2 \times 10^{-5}$ psi, as compared to a normal atmospheric pressure at sea level of about 14.7 psi. This is far smaller than the normal barometric fluctuations caused by changing meterological conditions. To complete the illustration, if the indicated pressure differential were to be applied to an actuator rod with a cross-section of one square inch, the increase in the restoring force on the fully withdrawn actuator rod would amount to only about 8.6 dynes, as compared to the total restoring force of about 6,547,000 dynes exerted on the rod by atmospheric pressure. In practical applications, with the retracted actuator rod not occupying a very large part of the canister interior, and hence not causing a very large reduction in the canister pressure when it is withdrawn, the variation in the restoring force will be even less.

It should be noted that, unlike conventional piston and cylinder arrangements, the present invention does not require a close-fitting relationship between the outside surface of the actuator rod 24 and the interior walls of the canister 22. In fact, for the purposes of the present invention it is preferable that the actuator rod 24 and the interior walls of the canister 22 be maintained in a spaced-apart, non-contacting relationship as illustrated in FIG. 1, since this minimizes the frictional forces that occur during movement of the actuator rod between its fully retracted and fully withdrawn positions.

The tensioning device 20 of FIG. 1 may be constructed using any suitable materials and dimensions, and the following specifications are mentioned merely by way of example. The barrel portion 26 of the canister may be made of a metal or metal alloy, such as brass, with an outside diameter of about 1⅛ inches, an inside diameter of about 1 inch, and a length of about 7 inches. The end cap 28 may be made from a ¾-inch brass pipe plug, suitably drilled and tapped to accommodate the screw 34. The rod cap 30 may also be made of brass, although a durable plastic material such as Delrin can also be used. The actuator rod 24 may comprise a cylindrical steel rod about 7 inches in length and ½ inch in diameter with a 0.039-inch wide groove located about ½ inch from one end to accommodate the snap ring 54. A ⅜-inch diameter internally threaded bore may be provided at the other end of the rod to accommodate the rod end bearing 52. For an actuator rod of these dimensions, and assuming that the canister 22 is evacuated to a pressure on the order of 0.001 torr, the restoring force acting on the actuator rod will be about 2.89 pounds or 1,285,500 dynes, at a local barometric pressure of 14.7 psi (760 torr). The snap ring 54 may be a No. 5100-50 steel snap ring which is available from Waldes Tru-Arc Company of Long Island City, New York. The rod end bearing 52 may be a Spherco Rod End, Part No. FRE-6, which is available from the Morse Chain Division of Borg-Warner Corporation, Ithaca, New York. The remaining components of the FIG. 1 device are conventional and require no further description herein. Again, it should be understood that the foregoing dimensions and material specifications are presented by way of example only, and are not intended to limit the scope of the invention in any way.

An important advantage of the present invention is that the likelihood of sudden, catastrophic failure of the tensioning device is substantially eliminated. Thus, with reference to the FIG. 1 embodiment, leakage of the canister 22 will merely cause the restoring force on the actuator rod 24 to gradually lessen. Unless the leakage is severe, the reduction in the restoring force will usually occur over a sufficiently long period of time to give ample warning that repair or replacement of the device is needed. If desired, the vacuum within the canister 22 can be maintained by a separate vacuum reservoir and/or vacuum pump, but for most applications the canister 22 will remain evacuated without such devices for reasonably long periods of time before replenishment of the vacuum is needed. It should be noted that the actuator rod 24 is always positively retained within the canister 22 by virtue of the snap ring 54, thereby preventing catastrophic separation of the device components even in the event of a serious leak in the canister 22.

Figure 2:
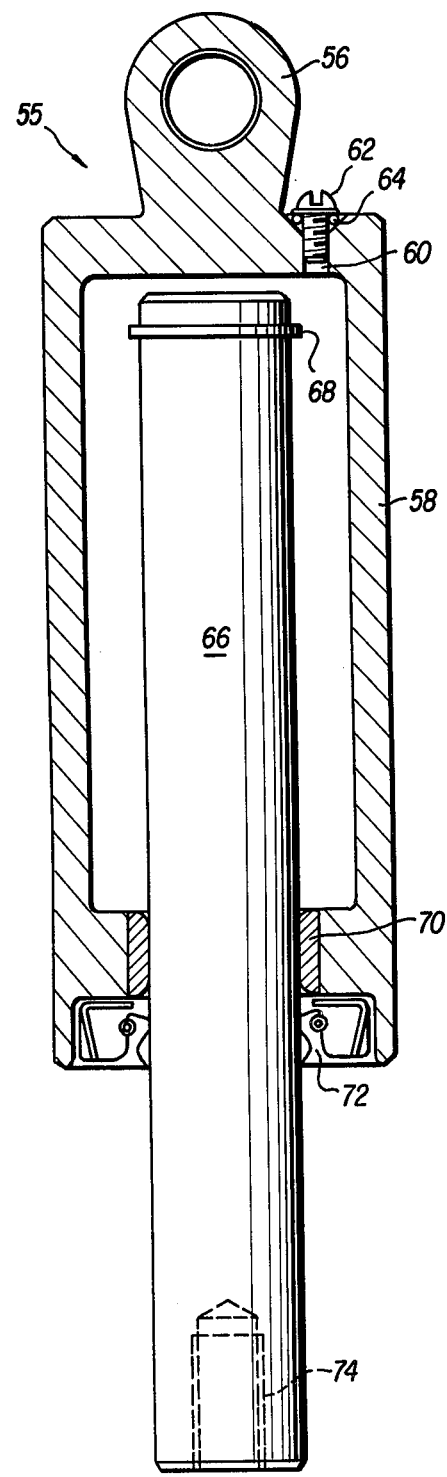
FIG. 2 is a cross-sectional view of a second type of constant-force tensioning device in accordance with the present invention, utilizing a flexible double-lip seal at the point where the actuator rod protrudes from the canister.

FIG. 2 illustrates a second type of constant force tensioning device 55, which differs from the embodiment of FIG. 1 primarily in the construction of the canister and the sliding vacuum seal for the actuator rod. In the FIG. 2 embodiment, the cylindrical canister 58 is of essentially one-piece construction with an integral eyelet 56 at the closed end thereof to permit attachment of the canister to a first part of a machine or other mechanical system. On one side of the eyelet 56 the canister 58 is provided with a threaded bore 60 which receives a closure screw 62 and O-ring seal 64. As in the FIG. 1 embodiment, the purpose of the screw 62 is to allow initial evacuation of the canister 58 or replenishment of the vacuum after extended periods of use, as well as the optional introduction of lubricants or other liquids as will be described hereinafter.

The cylindrical actuator rod 66 in FIG. 2 is provided with a snap ring 68 (similar to the snap ring 54 in FIG. 1) near its upper end to prevent the actuator rod from sliding completely out of the canister 58. The lower portion of the canister 58 defines a restricted circular opening which contains a solid guide bearing 70 for guiding the sliding motion of the actuator rod 66, and a spring-loaded double lip seal 72 for creating a sliding vacuum seal between the actuator rod and canister opening. The flexible double lip seal 72 conforms to the actuator rod 66 in the manner of a flexible wiper and therefore provides a somewhat better sliding vacuum seal than the pair of O-rings 44, 46 in FIG. 1. Suitable types of double-lip seals for this purpose are the Type CRWHA and Type CRSHA seals manufactured by the Chicago Rawhide Company of Franklin, North Carolina. These seals are capable of withstanding pressure differentials on the order of atmospheric pressure, which is the approximate pressure differential that exists across the seal 72 when the canister 58 is evacuated to the preferred level of about 0.001 torr or less. Nitrile rubber is an example of a preferred type of elastomeric material that may be used for the seal 72. Flexible single lip seals are also available, as are seals using other types of elastomers such as Viton, polyacrylate, and some silicone rubbers ("Viton" is a registered trademark of E.I. duPont de Nemours and Co.).

With continued reference to FIG. 2, the lower end of the actuator rod 66 is provided with a threaded bore 74 for allowing the actuator rod to be attached to a second relatively movable part of a machine or other mechanical system. With the canister evacuated to the preferred pressure of about 0.001 torr or less, the actuator rod 58 will tend to be drawn upwardly into the canister 58, thereby exerting a predetermined tensional force between the two machine parts (not shown) respectively connected to the canister eyelet 56 and actuator rod 66. The operation of this device will be the same as for the FIG. 1 device described earlier, except that the restoring force will depend upon the cross-sectional area of the particular actuator rod 66 used in the FIG. 2 embodiment. As in the earlier embodiment, the restoring force acting on the actuator rod 66 will remain substantially constant regardless of how far the actuator rod is moved into or out of the canister 58.

The device 55 of FIG. 2 is not provided with a stop or retainer for preventing the actuator rod 66 from sliding completely into the canister 58, although this may be provided if desired. In the device 55 as shown, the movement of the actuator rod 66 into the canister is arrested simply by the upper end of the actuator rod striking the top interior surface of the canister 58. This is not objectionable in many applications, particularly where the machine or mechanical system into which the device 55 is connected normally causes the actuator rod 66 to remain partially withdrawn from the canister 58 and hence separated from the top interior wall thereof.

Figure 3:
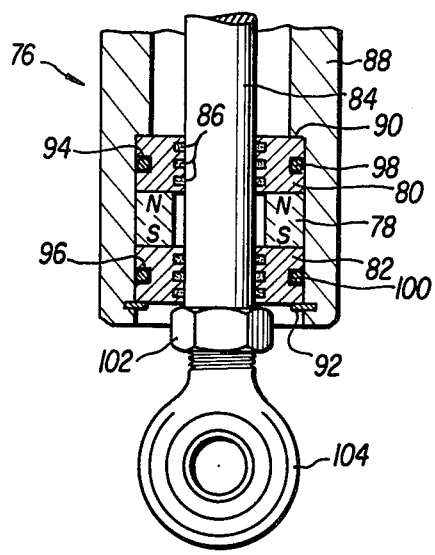
FIG. 3 is a partial cross-sectional view of a third type of constant-force tensioning device in accordance with the present invention, utilizing a ferrofluidic seal at the point where the actuator rod protrudes from the canister.

FIG. 3 is a partial cross-sectional view of a third type of tensioning device 76 in accordance with the present invention. The deive 76 is generally similar to the device 20 of FIG. 1 except that a ferrofluidic seal has been substituted for the O-ring seals 44, 46 of the FIG. 1 embodiment. Ferrofluidic-type seals are well known. See, for example, the article by R. Moskowitz entitled "Dynamic Sealing With Magnetic Fluids", dated May 2, 1974 and published in *ASLE Transactions,* Volume 18, No. 2, pages 135-143.. A typical ferrofluidic seal arrangement, which can be purchased in modular form, consists of a circular magnet 78 and two adjacent circular pole blocks 80, 82 surrounding the actuator rod 84. The pole blocks 80, 82, which are typically made of soft iron, each contain a number of circular grooves or recesses 86 which are filled with a ferromagnetic fluid. The magnetic circuit passing through the pole blocks 80, 82 and actuator rod 84 (which is also made of a magnetically permeable material, such as iron or steel) causes "focussing" of the ferromagnetic fluid in the grooves 86 so that the fluid bridges the gap between the pole blocks 80, 82 and the actuator rod 84. The focussed ferromagnetic fluid within the grooves 86 forms so-called "liquid O-rings" which, unlike conventional rubber O-rings, create a non-rubbing and nearly frictionless sliding vacuum seal between the actuator rod 84 and the canister opening. The pressure differential which can be supported by the ferrofluidic seal is a function of the magnetic field strength, and can be increased by multiplying the number of ferrofluidic stages in the seal, with 5 psi being a typical upper limit for the differential operating pressure across each stage. Multistage seals capable of supporting operating pressure differentials of up to 100 psi per axial inch of shaft length have been developed. There also exist ferrofluidic seals which can be used with non-magnetic shafts or rods, as for example in the case where the actuator rod 84 is made of a non-magnetic plastic or composite material.

As illustrated in FIG. 3, the barrel portion 88 of the canister is provided with an internal step or shoulder 90 to receive and hold the ferrofluidic seal components 78, 80 and 82. The barrel 88 is also provided with an internal circular groove near the lower end thereof for receiving a snap ring 92, which serves to hold the ferrofluid seal in place against the shoulder 90. In this way, the ferrofluidic seal is held firmly in place and cannot slip out of the canister during movement of the actuator rod 84. Circular grooves 94, 96 are provided on the outer circumference of the pole blocks 80, 82 for retaining resilient O-rings 98, 100, the latter providing a static seal between the barrel 88 and the ferrofluidic seal components.

The remaining components of the tensioning device 76 of FIG. 3, including the upper portions of the canister and actuating rod 84 which are not shown, are substantially the same as the corresponding components of the device 20 of FIG. 1. As in the earlier embodiment, the lower portion of the actuator rod 84 provided with a threaded bore for receiving a rod end bearing 104, which allows the actuator rod to be attached to a component of an external machine or other mechanical system. A hex nut 102 is provided on the threaded portion of the rod end bearing 104 to serve as a retainer or stop for limiting the inward travel of the actuator rod. When the canister is evacuated to a suitably low pressure, preferably about 0.001 torr or less as in the previous embodiments, the device 76 will apply a substantially constant restoring force to the actuator rod 84, regardless of its position, in the same manner as the devices described earlier.

Figure 4:
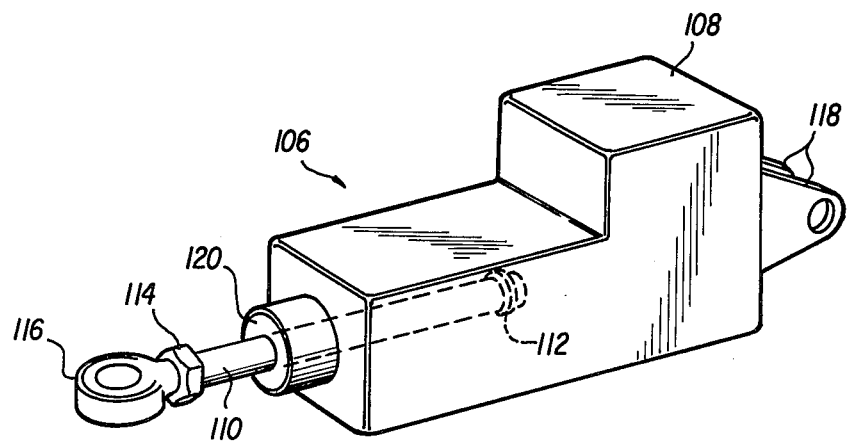
FIG. 4 is a perspective view of a fourth type of constant-force tensioning device in accordance with the present invention, utilizing a different canister shape to provide a larger interior volume.

A fourth type of tensioning device 106 in accordance with the present invention is illustrated in FIG. 4. In this embodiment the canister 108 has been enlarged and modified in shape, as an illustration that the canister can have any desired size and shape and is not restricted to a size and shape conforming to the actuator rod 110. Thus, for example, the size and shape of the canister may be selected according to the size and shape of the space that is available for it in a larger machine or mechanical system. The larger volume of the canister 108 in FIG. 4 is advantageous because it results in a lesser pressure reduction when the actuator rod 110 is fully withdrawn, and hence a lesser variation in the restoring force exerted on the actuator rod. More importantly, however, the larger volume of the canister 108 provides the device with a larger effective vacuum reservoir, thereby minimizing the effects of minor leaks which may occur in the canister or in the sliding vacuum seal. As in the previous embodiments, the actuator rod 110 is provided with a snap ring 112 or other type of retainer near its inner end, and a hex nut 114 and rod end bearing 116 at its outer end. The rear part of the canister 108 is provided with a pair of integral eyelets 118 which allow the canister to be connected to a first part of a machine or other mechanical system. The rod end bearing 116 allows the actuator rod 110 to be connected to a second part of a machine or other mechanical system. The canister 108 is provided with a projecting guide bearing portion 120 which houses a sliding vacuum seal for the actuator rod 110. The sliding vacuum seal may be of any of the three types described earlier in connection with FIGS. 1–3. When the canister 108 is substantially evacuated of air, preferably to a pressure of about 0.001 torr or less as in the previous embodiments, a restoring force will be exerted on the actuator rod 110 in the direction of the canister interior. This restoring force will provide the desired tension between the two machine parts or mechanical system to which the device 106 is connected. As before, the amount of tension will remain substantially constant regardless of the position of the actuator rod 110.

Figure 5:
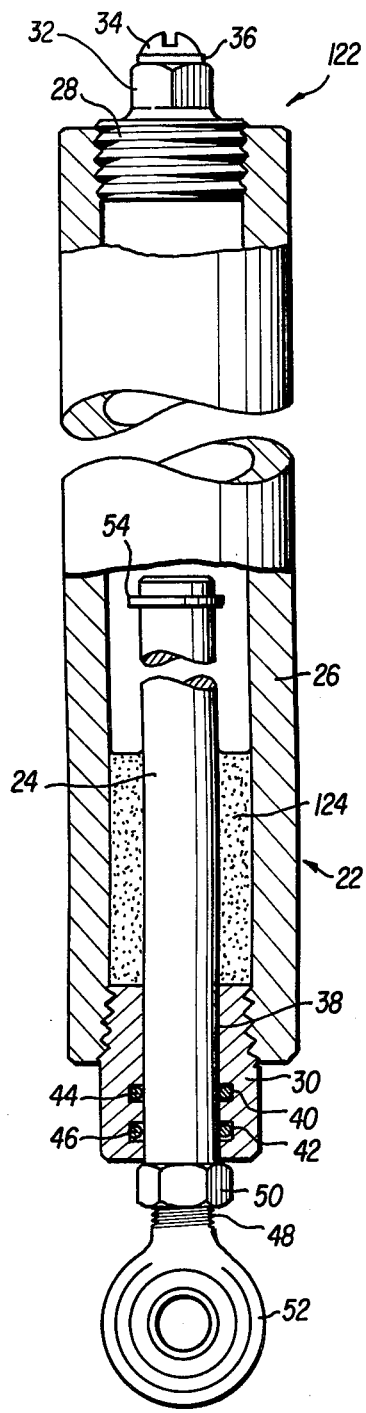
FIG. 5 is a cross-sectional view of a fifth type of constant force tensioning device in accordance with the present invention, in which a quantity of liquid lubricant is contained within the evacuated canister to assist the sliding motion of the actuator rod.

A fifth type of tensioning device 122 in accordance with the present invention is illustrated in FIG. 5. The physical construction of this device is exactly the same as the device 20 of FIG. 1, and for this reason the parts thereof have been correspondingly numbered. In the device 122 of FIG. 5, however, the canister 22 contains a quantity of oil 124 or other liquid lubricant for lubricating the actuator rod 24 and the O-ring seals 44, 46 which constitute the sliding vacuum seal between the actuator rod and the canister opening. This is helpful in alleviating the "stick-slip" behavior of the O-ring seals which arises from a relatively large difference between the static and dynamic coefficients of friction at the seals, resulting in an undesirable abrupt motion of the actuator rod 24 in response to an applied force. The device 122 of FIG. 5 is substantially evacuated of air, preferably to a pressure of about 0.001 torr or less as in the previous embodiments, and will exhibit a substantially constant restoring force as described earlier. The device 122 should, however, be maintained in an upright or nearly-upright position, as shown, in order to completely immerse the lower portion of the actuator rod 24 with lubricant in the region close to the O-ring seals 44, 46. The lubricant 124 may be added to the canister 22 either during initial assembly thereof, before the end cap 28 is installed, or subsequently, by temporarily removing the screw 34 and then restoring the vacuum within the canister after the lubricant has been introduced. The lubricant 124 may also be used in the modified tensioning device 55 of FIG. 2, but is not necessary in the embodiment of FIG. 3 since ferrofluidic seals are inherently very low in friction and experience no significant stick-slip problems.

Figure 6:
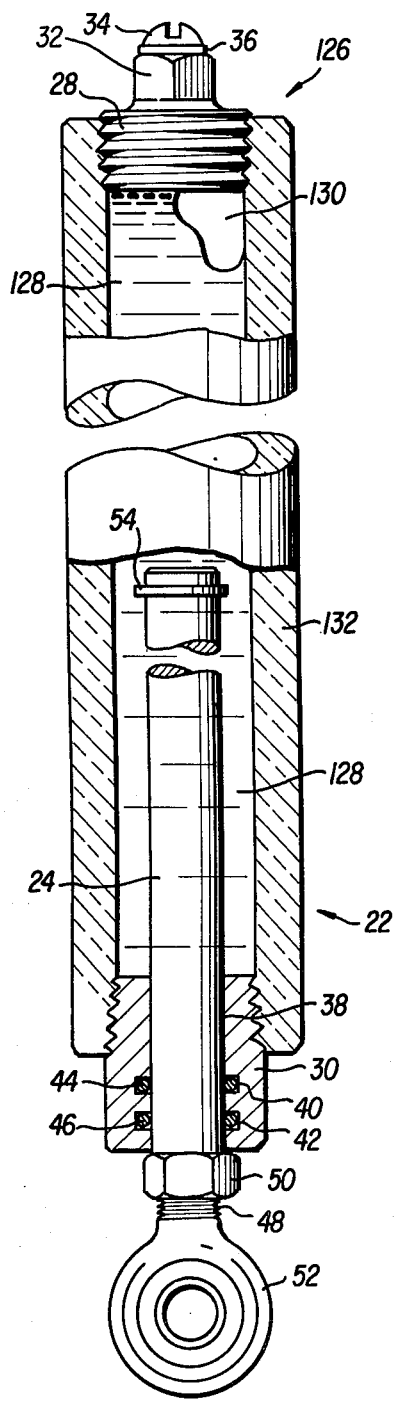
FIG. 6 is a cross-sectional view of a sixth type of tensioning device in accordance with the present invention, wherein the canister is at least partially filled with a vaporizable liquid which cavitates when the actuator rod is partially withdrawn to provide either a variable or a constant restoring force, depending upon the amount of liquid in the canister and whether any trapped air is present.

A sixth type of tensioning device 126 in accordance with the present invention is illustrated in FIG. 6. As with FIG. 5, the FIG. 6 embodiment is of substantially similar construction to the device 20 of FIG. 1, and the various parts of the device have therefore been numbered to correspond to FIG. 1. In FIG. 6, however, the canister 22 has been substantially completely filled with a vaporizable liquid 128 with the actuator rod 24 in its fully retracted position (shown) within the canister. This eliminates the need for evacuating the canister 22 of air. In addition, the barrel portion 132 of the canister in this embodiment is preferably made of a transparent material, such as plexiglass, for a purpose which will become apparent as the description proceeds. In operation, forcible withdrawal of the actuator rod 24 from the canister 22 through the restricted opening 38 causes the pressure on the liquid 128 to decrease, eventually reaching the point at which the liquid begins to cavitate. Since most liquids are nearly incompressible, the decrease in the liquid pressure takes place without any significant movement of the actuator rod. When the liquid cavitation point is reached, further withdrawal of the actuator rod 24 causes increasing amounts of the liquid to vaporize, resulting in the formation of cavitation bubbles within the liquid. These bubbles correspond to the displaced volume of the actuator rod 24. When the actuator rod is restored to its fully retracted position, the cavitation bubbles vanish.

During the operating stroke of the tensioning device 126, the restoring force exerted on the actuator rod 24 is a substantially constant value which depends upon the difference between the liquid vapor pressure and the local barometric pressure external to the canister 22, as well as upon the cross-sectional area of the actuator rod 24. Further withdrawal of the actuator rod 24 beyond any given point will simply cause more of the liquid 128 to vaporize, but will not affect the pressure differential acting on the actuator rod.

The liquid 128 is preferably a low vapor pressure liquid such as high-viscosity silicone oil, mercury, or pure ethylene glycol. This is desirable because the force of the device 126 is inversely dependent upon the vapor pressure of the liquid used, with low vapor pressure liquids providing the highest restoring forces.

After a number of operating cycles, dispersed air molecules within the liquid 128 may condense out to form a discrete air bubble, as indicated by the reference numeral 130 in FIG. 6. This may also occur as a result of gradual canister leakage. The air bubble 130, which is undesirable in embodiments wherein the canister 22 is intended to be completely filled with the liquid 128, may be observed through the transparent walls of the canister barrel 132. The air bubble 130 may be eliminated by temporarily removing the screw 34 and adding the needed additional amount of liquid to the canister.

The restoring force of the tensioning device 126 in FIG. 6 can be varied by varying the amount of liquid contained in the canister 22, with air (e.g., at atmospheric pressure) occupying the remaining volume of the canister. The restoring force decreases as the amount of liquid in the canister is decreased. The transparent side walls of the canister barrel portion 132 allow the level of the liquid within the canister 22 to be readily observed, and the removable screw 34 permits liquid to be added or removed as desired. One advantage of the partially liquid-filled embodiment is that the trapped air volume, which is compressible, allows the device to be used as a compression damper as well as a tensioning device. In embodiments wherein the liquid 128 does not completely fill the canister, however, the tension force characteristic of the device is initially variable rather than constant. That is, as the actuator rod 24 is initially withdrawn from the canister 22, the restoring force will gradually increase from zero as the pressure of the trapped air decreases and its volume increases. When the air pressure drops to a point where cavitation of the liquid 128 can occur, the pressure within the canister will stabilize at the vapor pressure of the liquid and will remain at that value despite further withdrawal of the actuator rod. Thus, once the cavitation point of the liquid is reached, the partially-filled device 126 begins to operate in a constant force mode. Constant force operation of this embodiment throughout the entire range of movement of the actuator rod can be obtained in a number of different ways. For example, the pressure of the air trapped within the canister can be reduced to the liquid cavitation point, either permanently or by means of an external piston and cylinder device which can be operated as needed. Alternatively, the device 126 can be preloaded by maintaining the actuator rod 24 in a partially withdrawn position at all times, thereby maintaining the pressure of the trapped air at the cavitation point of the liquid 128. This may be done either by means of an integral stop device on the actuator rod 24, or by installing the device 126 in a machine or other mechanical system which normally tends to maintain the actuator rod 24 in a partially withdrawn position.

It should be observed that the O-ring seals 44, 46 have a dual function in the device 126 of FIG. 6. At all times, whether the actuator rod 24 is retracted or extended, the O-ring seals 44, 46 serve to retain the liquid 128 within the canister 22. During withdrawal of the actuator rod, however, the O-ring seals also function to isolate the interior of the canister 22 from ambient atmospheric pressure, thereby preventing the infiltration of outside air into the canister as the pressure therein decreases.

An important distinction should be drawn between the device 126 of FIG. 6 and conventional liquid-filled viscous dampers and shock absorbers. In the latter type of device, the plunger rod terminates in a piston which is maintained in close-fitting sliding contact with the interior walls of the cylinder. The damping or cushioning effect is obtained by the liquid passing through holes or valves in the piston as the plunger rod moves back and forth. This is not the case in the device 126 of FIG. 6. The actuator rod 24 does not require a piston and is preferably maintained in a spaced-apart, non-contacting relationship with the interior walls of the canister 22 as shown. Moreover, unlike conventional viscous dampers and shock absorbers, the operation of the device 126 does not depend on the viscous flow of the liquid 128 around or through any portion of the actuator rod 24.

A seventh type of tensioning device 134 in accordance with the present invention is illustrated in FIG. 7. In this embodiment, the interior volume of the canister 136 is divided into two portions 138, 140 by a rolling diaphragm seal 142. The rolling diaphragm seal 142 preferably consists of a sheet of Dacron fabric impregnated with rubber ("Dacron" is a registered trademark of E.I. duPont de Nemours and Co.). Rolling diaphragm seals of this type are available commercially from the Bellofram Corporation of Burlington, Massachusetts. The upper portion 140 of the canister is substantially evacuated of air, preferably to a pressure of about 0.001 torr or less as in previous embodiments. The lower portion 138 of the canister, however, is maintained substantially at ambient atmospheric pressure by means of a vent hole 144 which communicates with the external atmosphere. The lower portion of the canister 136 contains an additional opening 145 which is lined by a solid guide bearing 146. A movable actuating member in the form of a rigid elongated rod 148 is slidably received within the guide bearing 146 with its lower portion protruding from the canister opening as shown. The reduced lower end 150 of the actuator rod 148 is provided with external threads, as shown, to enable attachment of the actuator rod to a first part of a machine or other mechanical system in which tension is to be maintained.

The upper end of the actuator rod 148 contains a threaded bore for receiving a threaded bolt 154. Attached to the top of the actuator rod 148, by means of the bolt 154, are a circular clamping plate 156 and a hollow, cup-shaped piston 158 which is contained within the evacuated portion 140 of the canister interior and faces upward toward the top of the canister. The central portion of the rolling diaphragm seal 142 is clamped between the clamping plate 156 and the lower surface of the piston 158, thereby effectively attaching the rolling diaphragm seal 142 to the upper end of the actuator rod 148 for movement therewith. It will be appreciated that, as the actuator rod 148 is extended and retracted through the canister opening 145 and guide bearing 146, the diaphragm seal 142 rolls and unrolls along the interior walls of the canister 136 to maintain pressure isolation between the evacuated portion 140 of the canister and the portion 138 which remains at ambient atmospheric pressure. The vertical side walls of the piston 158, which is enlarged relative to the diameter of the actuator rod 148, provide support for the evacuated side of the diaphragm seal 142 during the unrolling and rolling thereof. The canister 136 is preferably made in two parts 160, 162 with mating flange portions 164, 166 which define a peripheral internal gap 168 therebetween for retaining and tightly clamping the beaded edge 169 of the diaphragm seal 142. A number of threaded bolts 170 or other fastening means may be provided through the flange portions 164, 166 to secure the two portions 160, 162 of the canister together. An integral eyelet 172 is provided on the top of the canister portion 162 to permit attachment of the canister to a second part of a machine or other mechanical system.

The tensioning device 134 of FIG. 7 operates generally in the same manner as the evacuated devices of FIGS. 1-5, described previously, and is also characterized by a substantially constant restoring force regardless of how far the actuator rod 148 is withdrawn from the canister 136. In use, the device is connected between two relatively movable parts of a machine or other mechanical system by means of the threaded end 150 of the actuator rod and the integral eyelet 172 on the canister. A substantially constant tensional force, which will depend upon the local barometric pressure and the effective cross-sectional area of the diaphragm seal 142, will then be maintained between the two mechanical parts. An important advantage of this embodiment is the fact that, by virtue of the rolling diaphragm seal 142, the need for a sliding vacuum seal between the actuator rod 148 and the canister opening 145 is eliminated. In addition, the rolling diaphragm seal virtually eliminates the "stick-slip" friction problems which can be encountered with some conventional types of seals. Finally, a greater restoring force is obtained in this embodiment since the effective cross-sectional area of the rolling diaphragm seal 142 is greater than the cross-sectional area of the actuator rod 148.

FIG. 8 is a partial view of a modified tensioning device 173 which is similar in most respects to the embodiment of FIG. 7, except that the bottom portion 160 of the canister 136 has been modified to receive a ball-type bushing 174 in place of the solid guide bearing 146 of FIG. 7. The bushing 174 includes a number of rows of recirculating steel balls 176 of the type used in conventional ball bearings, which are urged into contact with the actuator rod 148 and greatly reduce the friction encountered when the actuator rod is moved into and out of the canister 136. Bushings of this type are available commercially from Thomson Industries, Inc., of Manhasset, New York. The portions of the tensioning device 173 which are not shown in FIG. 8 are identical in all respects to the corresponding portions of the tensioning device 134 in FIG. 7.

FIG. 9 illustrates a ninth type of tensioning device 178 constructed in accordance with the principles of the present invention. The canister 180 is of one-piece construction and is substantially evacuated of air, preferably to a pressure of about 0.001 torr or less as in earlier embodiments. In the device of FIG. 9, however, the rigid actuator rod of the previous embodiments is replaced with an elongated actuator rod 182 made of a flexible material which is capable of collapsing or folding upon itself within the canister 180. The total outstretched length of the flexible actuator rod 182 is preferably greater than the greatest interior dimension of the canister 180. This provides the device 178 with a longer operating stroke than would ordinarily be possible with a rigid actuator rod. The flexible actuator rod 182 of FIG. 9 may comprise, for example, a solid body of flexible synthetic plastic material, such as polyurethane, with a smooth outer surface. Alternatively, the flexible actuator rod 182 may comprise an inner core of braided metal strands forming a flexible cable, together with a smooth outer covering of synthetic plastic material. Nylon-coated steel fiber aircraft cable is an example of a material usable for the latter type of flexible actuator rod.

A retaining ring 184, larger in dimensions than the canister opening 186, is provided near the upper end of the flexible actuator rod 182 to prevent the actuator rod from sliding completely out of the canister 180 when the device 178 is in use. The end of the flexible actuator rod 182 which protrudes out of the canister 180 is fitted with a rod end bearing 190 and hex nut 188 as in the embodiment of FIG. 1. The hex nut 188, having dimensions larger than the canister opening 186, prevents the flexible actuator rod 180 from sliding completely out of the canister 180 when the device 178 is in use.

Circular internal grooves 192, 194 are formed in the canister opening 186 for receiving a pair of resilient O-rings 196, 198. The O-rings 196, 198 bear against the smooth outer surface of the flexible actuator rod 182 to create a sliding vacuum seal which maintains the evacuated condition of the canister 180 during extension and retraction of the actuator rod. The flexible actuator rod 182 and/or the O-ring seals 196, 198 may be coated with a suitable lubricant, such as silicone grease, to enhance the effectiveness of the sliding vacuum seal and reduce friction.

The rod end bearing 190 allows the flexible actuator rod 182 to be attached to a first part of a machine or other mechanical system. The top of the canister 180 is provided with an integral eyelet 191 for attachment to a second, relatively movable part of a machine or other mechanical system. When so connected, the device 178 exerts a predetermined tensioned force between the two relatively movable machine parts which will depend upon the local barometric pressure and the cross-sectional area of the flexible actuator rod 182. As in previous embodiments utilizing evacuated canisters, the restoring force on the flexible actuator rod 182 will remain substantially constant regardless of the extent to which it has been withdrawn from the canister 180.

As noted, the primary advantage of the device 178 of FIG. 9 over previous embodiments is its longer operating stroke, made possible by the ability of the flexible actuator rod or cable 182 to collapse or fold upon itself when it is in a relaxed condition within the canister 180. The orientation of the collapsed actuating rod 182 within the canister 180 is unimportant, and may comprise either a repeating non-random arrangement or an entirely random arrangement. If a repeating non-random arrangement is desired, such as the helical coil shown in FIG. 9, the flexible actuator rod 182 may be pre-formed with a "memory" characteristic which will cause the collapsed actuator rod to assume the same shape each time that it is fully retracted into the canister 180. A number of available materials, including some types of plastics and plastic-coated cables, can be made to behave in this way. Depending upon the outstretched length, flexibility and cross-sectional area of the flexible actuating rod 182, and the interior volume of the canister 180, an almost unlimited operating stroke can be provided for the device 178.

Figure 10:
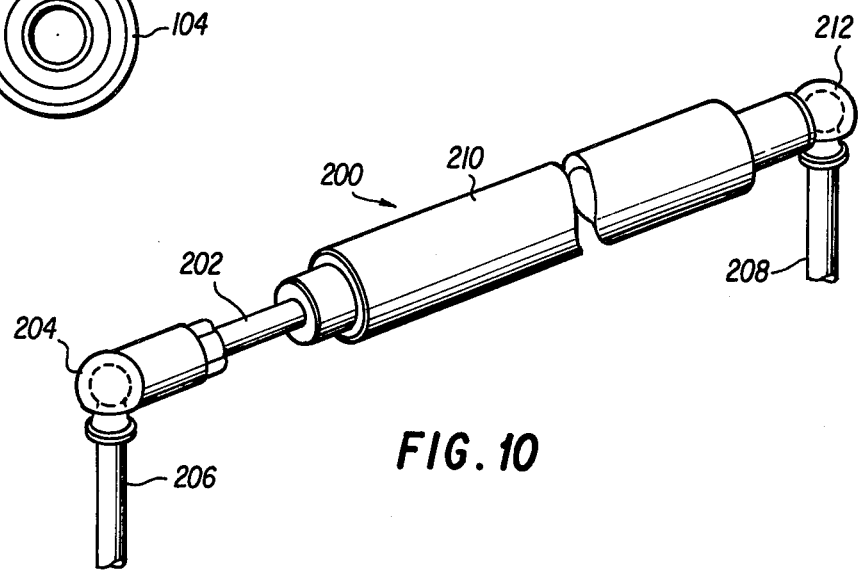
FIG. 10 is a perspective view of a tensioning device constructed in accordance with the present invention and connected between two relatively movable machine parts to provide a predetermined amount of tension therebetween.

FIG. 10 illustrates an exemplary mechanical system utilizing a tensioning device 200 in accordance with the present invention. The tensioning device 200 is illustrated generally and may comprise any of the various types of constant or variable force tensioning devices described above in connection with FIGS. 1–9. The actuator rod 202 of the tensioning device 200 is connected by means of a ball joint fitting 204 to a first part 206 of a machine or other mechanical system. A second part 208 of the machine or mechanical system, which is movable relative to the first part 206, is connected to the canister 210 of the tensioning device 200 by means of a second ball joint fitting 212. Depending upon the internal construction of the tensioning device 200, either a constant or variable tensional force will be maintained between the two mechanical parts 206 and 208 by the device 200.

From the foregoing description, it can be readily seen that the present invention provides a simply yet very effective tensioning device which can be used to exert either a constant or variable tensional force between two relatively movable parts of a machine or other mechanical system. In its constant-force embodiments, the invention provides a restoring force which does not change appreciably regardless of the displacement or deflection distance. The restoring force in these embodiments is sensitive only to the local barometric pressure at the device location, which generally varies only within narrower limits at any given altitude relative to sea level. In applications where the local barometric pressure is subject to frequent and substantial changes (e.g., due to extreme altitude changes aboard an aircraft), the tensioning devices of the present invention may be used in combination with other types of tensioning devices which compensate for the barometric sensitivity. Alternatively, the barometric sensitivity of the tensioning devices disclosed herein may be exploited to perform some useful function, such as automatic trimming of airfoil control surfaces in an aircraft. Numerous other useful applications of the invention will undoubtedly occur to those of ordinary skill in the art.

Although the present invention has been described with reference to a number of specific preferred embodiments, the invention is not limited to the details thereof. A number of possible modifications and substitutions have been suggested in the foregoing detailed description, and others will be apparent to those of ordinary skill in the art. All such substitutions and modifications are intended to fall within the scope of the invention as defined in the appended claims.

What is claimed is:

1. A tensioning device for exerting a substantially constant tensional force between two relatively movable parts of a machine or other mechanical system, said tensioning device comprising:
    (a) a sealed and substantially evacuated canister having an opening therein for accommodating a movable actuating member;
    (b) a movable actuating member projecting into said canister and having one end protruding from the opening in said canister, said movable actuating member having a sliding relationship with the opening in said canister to allow the movable actuating member to be partially withdrawn from the canister through said opening in response to a force applied between the movable actuating member and the canister, said movable actuating member including an elongated rod made of a flexible material which is capable of collapsing or folding upon itself within the canister, said elongated rod having a total outstretched length greater than the greatest interior dimension of said canister; and
    (c) sealing means for creating a sliding vacuum seal between said movable actuating member and the opening in said canister, said sealing means serving to maintain the substantially evacuated condition of said canister.

2. A tensioning device as claimed in claim 1, wherein the portion of said actuating member which projects into the canister is maintained in a spaced-apart, non-contacting relationship with the interior walls of said canister.

3. A tensioning device as claimed in claim 2, further comprising retaining means for preventing said movable 4. A tensioning device as claimed in claim 3 wherein said retaining means comprises:
(a) a first retaining device provided on the part of the rod which protrudes from the opening in the canister; and
(b) a second retaining device provided on the part of the rod which projects into the canister, said first and second retaining devices having dimensions too large to pass through the opening in the canister. actuating member from sliding completely into or out of the canister.

5. A tensioning device as claimed in claim 4, wherein said rod is provided with first attachment means on the protruding end thereof for attachment to a first mechanical part, and wherein said canister is provided with second attachment means for attachment to a second mechanical part which is movable with respect to said first mechanical part.

6. A tensioning device as claimed in claim 1 or 2, wherein said canister contains a quantity of liquid lubricant for lubricating said sliding vacuum seal.

7. A tensioning device as claimed in claim 1 or 2, wherein said canister is evacuated to a pressure of about 0.001 torr or less.

8. A tensioning device as claimed in claim 1 or 2, wherein said sealing means comprises at least one resilient O-ring disposed within the opening in said canister.

9. A tensioning device as claimed in claim 1 or 2, wherein said sealing means comprises a flexible lip seal disposed at the opening in said canister.

10. A tensioning device as claimed in claim 1 or 2, wherein said sealing means comprises a ferrofluidic seal disposed within the opening in said canister.

11. A tensioning device as claimed in claim 1, wherein said flexible material comprises a solid body of synthetic plastic material having a smooth outer surface.

12. A tensioning device as claimed in claim 1, wherein said flexible material comprises:
(a) an inner core of metal strands forming a flexible cable, and
(b) a smooth outer covering of synthetic plastic material.

* * * * *